United States Patent
Patil et al.

(10) Patent No.: US 11,418,957 B2
(45) Date of Patent: Aug. 16, 2022

(54) SYSTEMS AND METHODS FOR SECURELY UPDATING AND MANAGING UNIVERSAL SUBSCRIBER IDENTITY MODULE INFORMATION

(71) Applicant: Verizon Patent and Licensing Inc., Arlington, VA (US)

(72) Inventors: Sudhakar Reddy Patil, Flower Mound, TX (US); Bjorn Hjelm, Livermore, CA (US); Kent W. Hughes, Oakland, CA (US); Gerardo S. Libunao, Manalapan, NJ (US); Yousif Targali, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 451 days.

(21) Appl. No.: 16/683,775

(22) Filed: Nov. 14, 2019

(65) Prior Publication Data

US 2021/0153009 A1    May 20, 2021

(51) Int. Cl.
*H04W 12/30* (2021.01)
*H04W 12/40* (2021.01)
*H04W 12/06* (2021.01)
*H04W 12/037* (2021.01)

(52) U.S. Cl.
CPC ......... *H04W 12/35* (2021.01); *H04W 12/037* (2021.01); *H04W 12/06* (2013.01); *H04W 12/40* (2021.01)

(58) Field of Classification Search
CPC ...... H04W 12/06; H04W 12/40; H04W 12/35
USPC .......................................................... 713/155
See application file for complete search history.

(56) References Cited

U.S. PATENT DOCUMENTS

| | | | |
|---|---|---|---|
| 10,425,817 B2 * | 9/2019 | Torvinen | H04W 12/06 |
| 10,743,176 B1 * | 8/2020 | Khan | H04W 12/48 |
| 2017/0289804 A1 * | 10/2017 | Kovacevic | G06F 21/575 |
| 2018/0062853 A1 * | 3/2018 | Li | H04L 63/0876 |
| 2020/0413249 A1 * | 12/2020 | Ramisetty | H04W 12/0431 |
| 2021/0153009 A1 * | 5/2021 | Patil | H04W 12/03 |
| 2021/0160691 A1 * | 5/2021 | Liu | H04L 63/0428 |
| 2021/0409934 A1 * | 12/2021 | Tiwari | H04W 12/30 |

* cited by examiner

*Primary Examiner* — Lizbeth Torres-Diaz

(57) ABSTRACT

A device may receive, from a network device, a user equipment (UE) parameter update request notification indicating an update to a UE parameter of a universal subscriber identity module (USIM), and may generate an encrypted UE parameter update request. The device may cause the encrypted UE parameter update request to be provided to the USIM to cause the USIM to update the UE parameter and to generate an encrypted UE parameter update response. The device may receive, from the network device, the encrypted UE parameter update response, and may verify an authenticity of content of the encrypted UE parameter update response based on whether the encrypted UE parameter update response is signed by the USIM. The device may provide, to the network device, a result indicating whether the UE parameter is updated and whether the authenticity of the content of the encrypted UE parameter update response is verified.

20 Claims, 9 Drawing Sheets

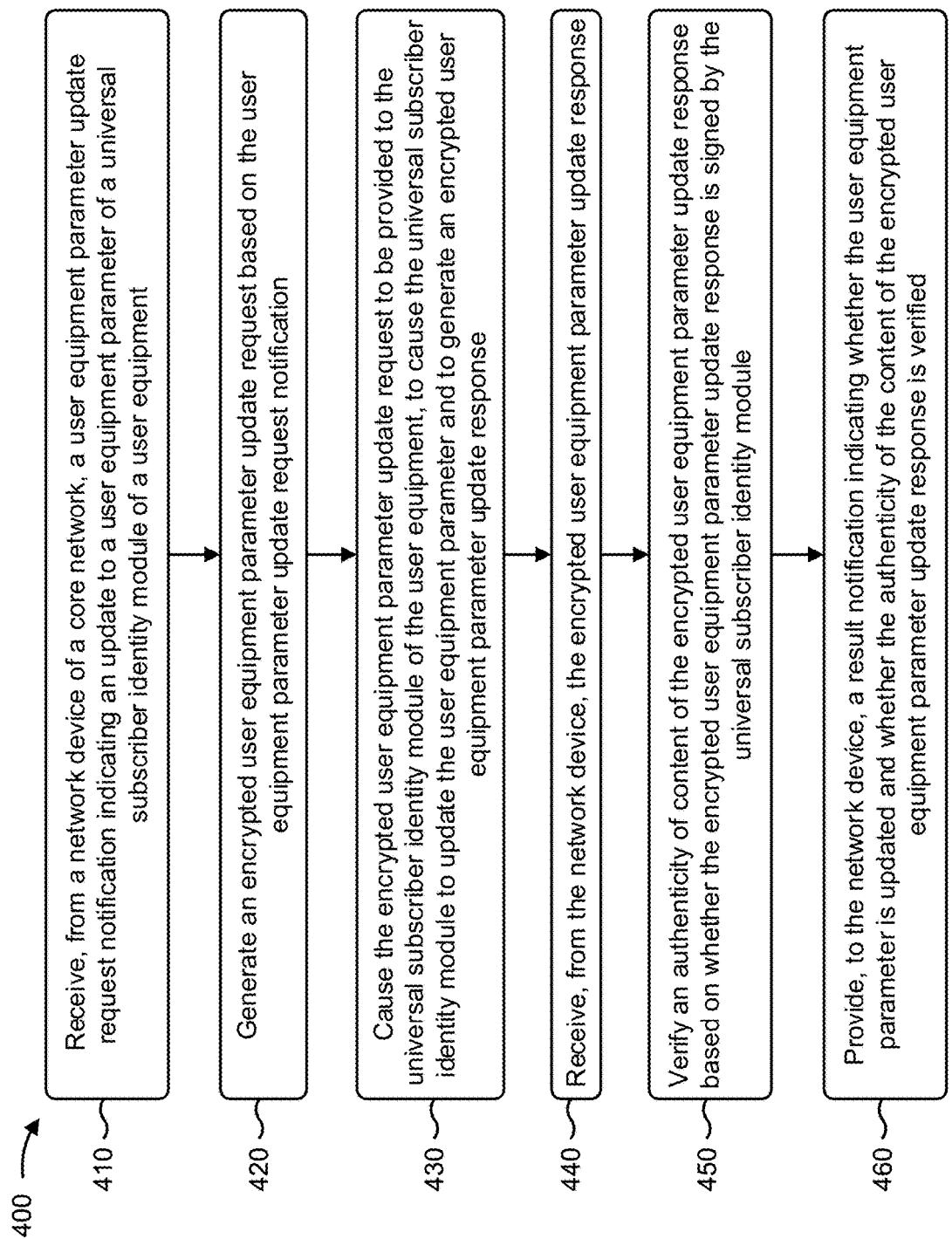

SYSTEMS AND METHODS FOR SECURELY UPDATING AND MANAGING UNIVERSAL SUBSCRIBER IDENTITY MODULE INFORMATION

BACKGROUND

A subscription permanent identifier (SUPI) concealed identifier (SUCI) may be exchanged between a user equipment (UE) (e.g., a universal subscriber identity module (USIM) of the UE) and a network in an insufficiently encrypted format.

BRIEF DESCRIPTION OF THE DRAWINGS

FIG. 4 is a flow chart of an example process for securely updating and managing universal subscriber identity module information via networks.

DETAILED DESCRIPTION OF PREFERRED EMBODIMENTS

Figure 1A:
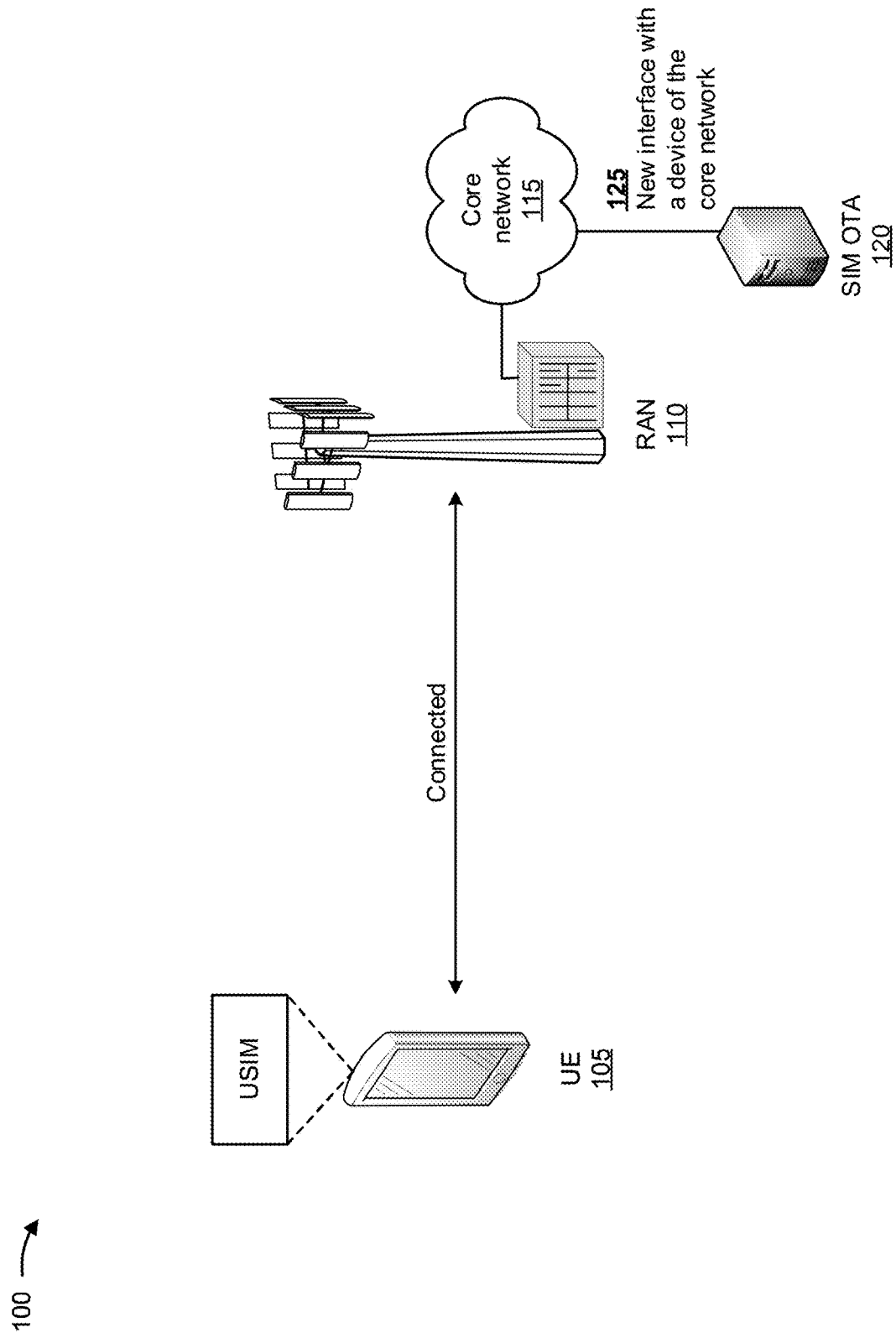
FIGS. 1A-1F are diagrams of one or more example implementations described herein.

The following detailed description of example implementations refers to the accompanying drawings. The same reference numbers in different drawings may identify the same or similar elements.

A fifth generation (5G) core network identifies subscription and/or subscriber information using the SUPI. When the UE provides the SUCI as the identifier of the UE, the 5G core network (e.g., a unified data management (UDM) device or component of the 5G core network) may de-conceal the SUCI to identify the SUPI. In large core networks, authentication server functions (AUSFs), UDMs, and unified data repositories (UDRs) may be segmented into several independent groups. Such groupings may be based on network operational boundaries, such as regions and/or markets. In such cases, a routing indicator, which is part of the SUCI, may enable the core network to identify a UDM or a UDM group that can perform the SUCI de-concealment. When a USIM of the UE is manufactured, a default value of the routing indicator may be included in the USIM. Alternately, if the routing indicator is not included in the USIM, then a default value of zero is applied for the routing indicator by the UE.

In core networks that employ independent grouping and segmentation of the AUSFs, the UDMs, and the UDRs, the routing indicator may be tied to the grouping. Thus, the routing indicator may require an update from the default value, allocated during manufacture of the USIM, to a value matching subscription storage in the grouping. Apart from the need to update the default value of the routing indicator, subscriptions may be periodically migrated from one AUSF/UDM/UDR group to another group for various reasons. When such a migration occurs, the routing indicator stored in the USIM may need to be updated. However, current techniques do not enable the UDM to securely update the routing indicator and other parameters (e.g., UE parameters) stored in the USIM of the UE. This wastes computing resources (e.g., processing resources, memory resources, communication resources, and/or the like), networking resources, and/or the like associated with detecting malicious activity associated with the UE parameters, correcting malicious acts caused with the UE parameters, and/or the like.

Some implementations described herein provide a device (e.g., a SIM over-the-air (SIM OTA) device) that securely updates and manages USIM information via networks. For example, the SIM OTA device may receive, from a network device of a core network, a user equipment (UE) parameter update request notification indicating an update to a UE parameter of a universal subscriber identity module (USIM) of a UE, and may generate an encrypted UE parameter update request based on the UE parameter update request notification. The SIM OTA device may cause the encrypted UE parameter update request to be provided to the USIM of the UE, wherein the encrypted UE parameter update request causes the USIM to update the UE parameter and to generate an encrypted UE parameter update response indicating that the UE parameter is updated. The SIM OTA device may receive, from the network device, the encrypted UE parameter update response, and may verify an authenticity of content of the encrypted UE parameter update response based on whether the encrypted UE parameter update response is signed by the universal subscriber identity module. The SIM OTA device may provide, to the network device, a result notification indicating whether the UE parameter is updated and whether the authenticity of the content of the encrypted UE parameter update response is verified.

In this way, by providing an interface between the SIM OTA device and the UDM, that utilizes the SIM OTA device security features (e.g., a secure packet mechanism), the SIM OTA device securely updates and manages USIM information (e.g., UE parameters to be updated) via a network. An update of UE parameters may be identified and triggered in the UDM and/or the SIM OTA device may propagate the updated UE parameters using the UDM and non-access stratum (NAS) mechanisms. Thus, the SIM OTA device may use fewer computing resources, networking resources, and/or the like that would otherwise be wasted detecting activity (e.g., malicious activity) associated with the UE parameters, correcting malicious acts caused with the UE parameters, and/or the like.

FIGS. 1A-1F are diagrams of one or more example implementations 100 described herein. As shown in FIG. 1A, a user equipment 105 (e.g., with a USIM) may be connected to a radio access network (RAN) 110 associated with a core network 115 and an SIM OTA device 120. RAN 110 may include one or more radio transmitters. Core network 115 may include an example architecture of a 5G next generation (NG) core network included in a 5G wireless telecommunications system, and may include physical elements, virtual elements, or a combination of physical and virtual elements. SIM OTA device 120 may securely update and manage USIM information via core network 115.

As further shown in FIG. 1A, and by reference number 125, SIM OTA device 120 may include a new interface with a device (e.g., a UDM) of core network 115. The new interface may enable the UDM to utilize security features of SIM OTA device 120, and may enable SIM OTA device 120 to securely update and manage UE parameters via core network 115. The new interface between SIM OTA device 120 and the UDM may include a service-based interface, supported by SIM OTA device 120, that includes registration and discovery functions through a network repository function (NRF) of core network 115.

In some implementations, a UE parameter may include a routing indicator parameter that enables core network 115 to identify a UDM or UDM group. For example, the routing indicator parameter may enable core network 115 to identify a UDM or UDM group that can de-conceal a SUCI to identify a SUPI. Additionally, or alternatively, a UE parameter may include a privacy feature parameter associated with one or more privacy features or attributes (e.g., authentication, master keys, credentials, and/or the like), a steering of roaming parameter, an operator value-added service parameter, and/or the like. In some implementations, an update of UE parameters may be identified and triggered in the UDM. Additionally, or alternatively, SIM OTA device 120 may propagate the updated UE parameters using the UDM and NAS mechanisms, as described herein.

Figure 1B:
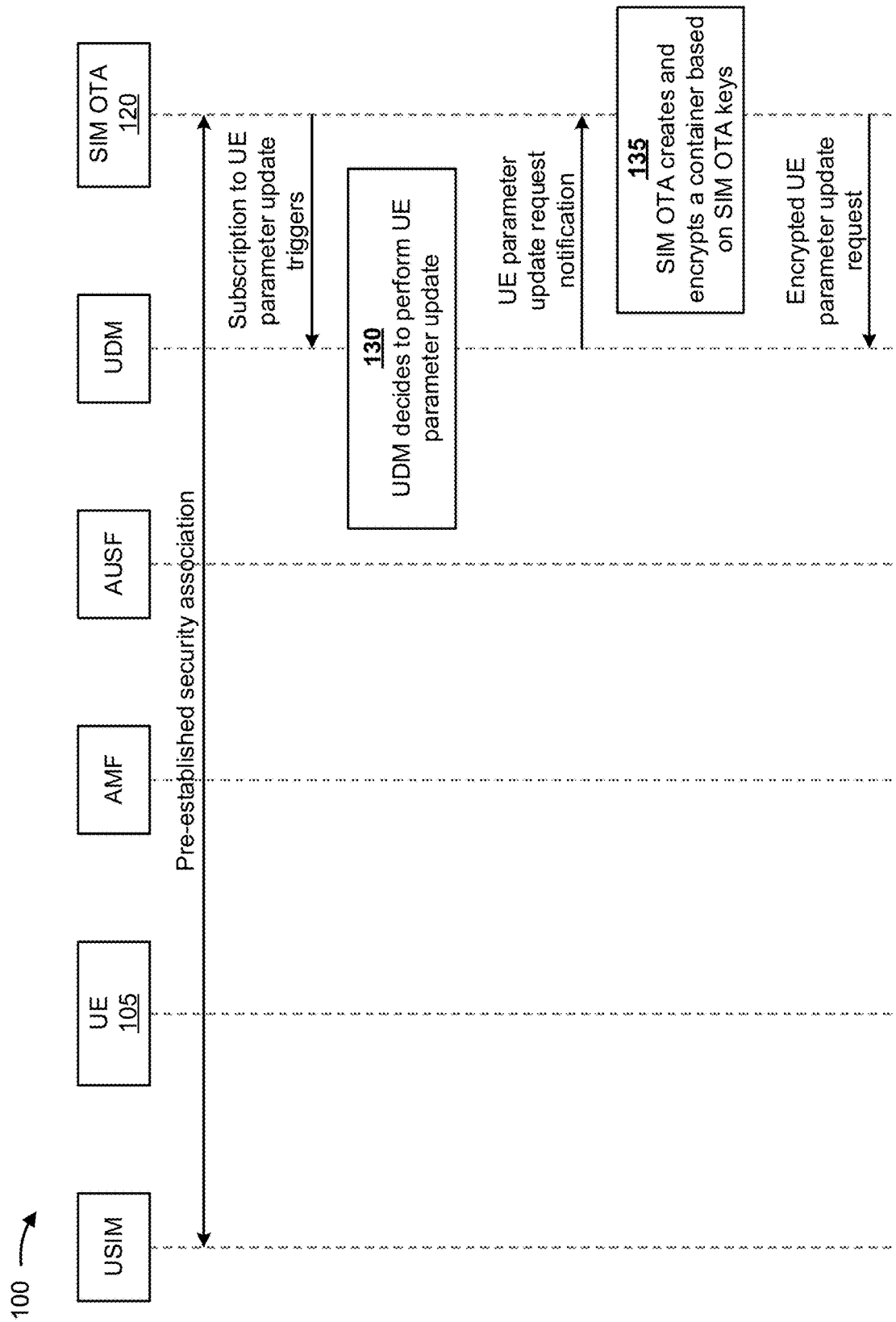
Figure 1C:
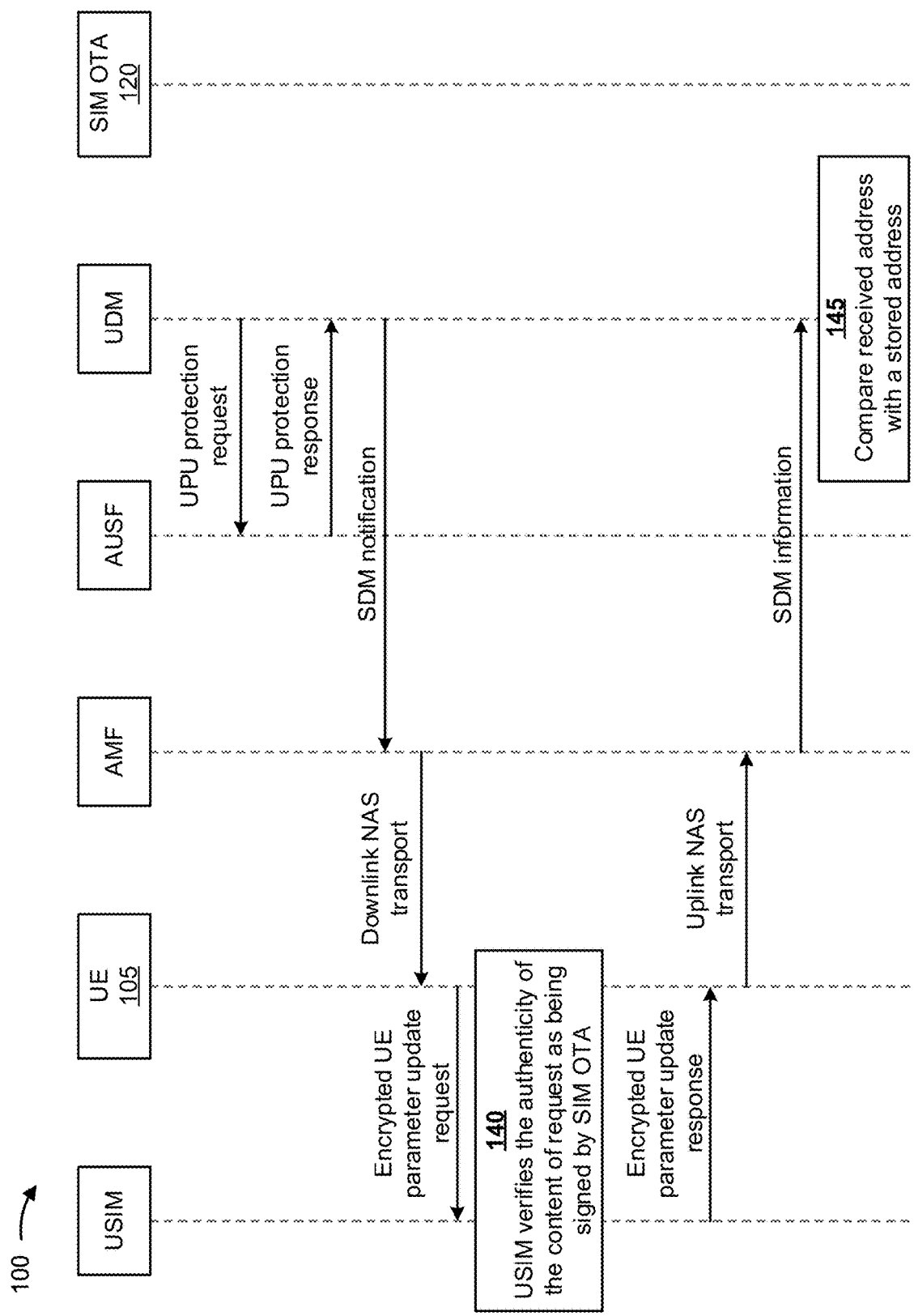
Figure 1D:
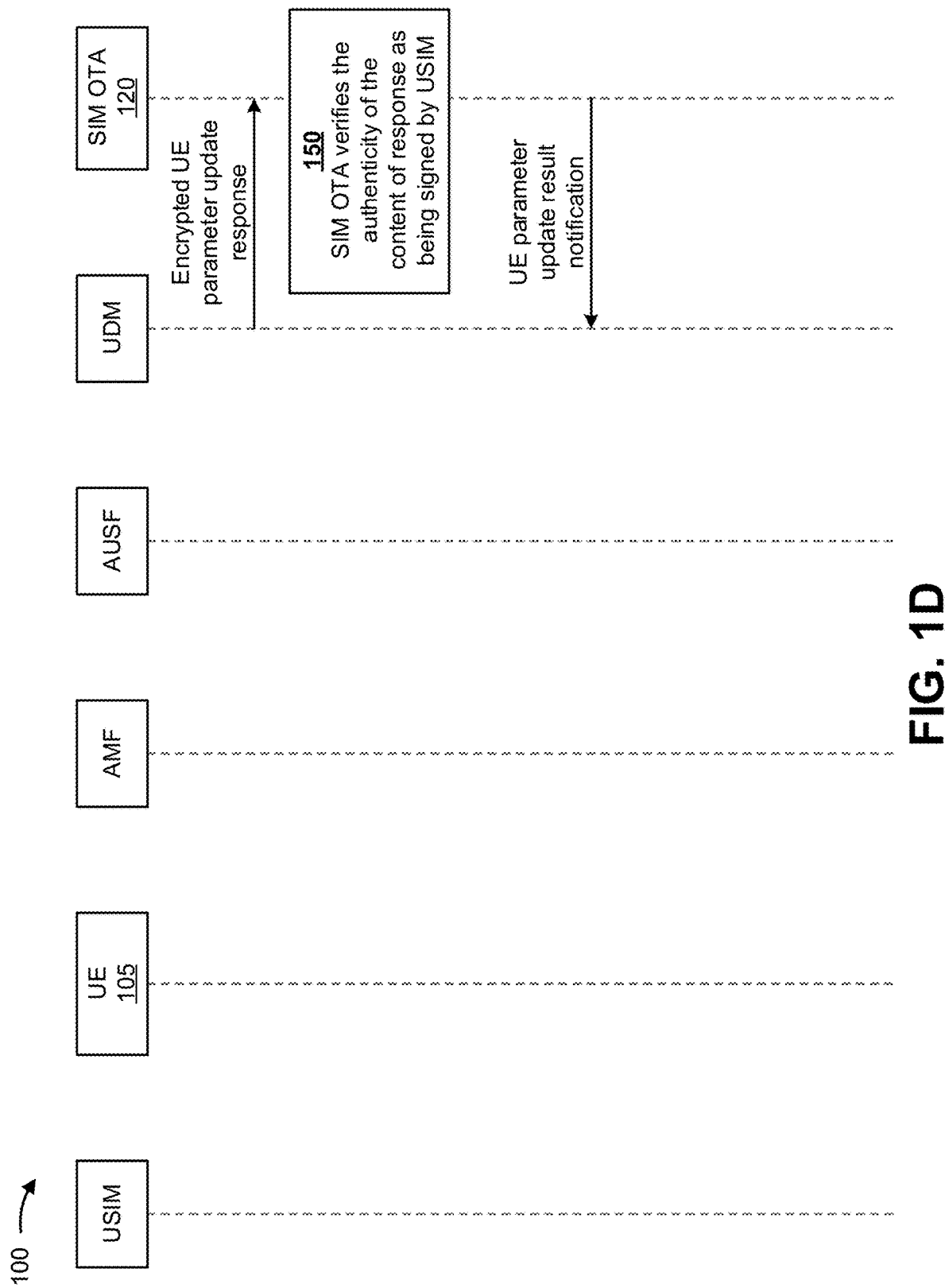

FIGS. 1B-1D are diagrams of a control flow associated with a secure UE parameter update that is triggered by the UDM. As shown in FIG. 1B, SIM OTA device 120 and the USIM associated with UE 105 may have a pre-established security association. The pre-established security association may be established prior to performing the functions described below. As further shown in FIG. 1B, SIM OTA device 120 may provide, to the UDM, a request to subscribe to UE parameter update triggers. In some implementations, the new interface between SIM OTA device 120 and the UDM (e.g., described above in connection with FIG. 1A) may be established prior to SIM OTA device 120 providing the request to subscribe to the UE parameter update triggers to the UDM.

As further shown in FIG. 1B, and by reference number 130, the UDM may decide to perform a UE parameter update. For example, the UDM may decide to perform the UE parameter update based on determining that UE 105 requires a parameter update (e.g., to provide a new service to UE 105), based on UE 105 moving to a different geographical area, based on UE 105 requiring a new service, based on UE 105 terminating a service, and/or the like. As further shown in FIG. 1B, the UDM may provide, to SIM OTA device 120, a UE parameter update request notification indicating an update to a UE parameter of the USIM associated with UE 105. For example, the UE parameter update request notification may include information identifying the UE parameter to be updated, one or more current values for the UE parameter, one or more recommended new values for the UE parameter, and/or the like. In some implementations, the UDM may provide the UE parameter update request notification to SIM OTA device 120 based on SIM OTA device 120 subscribing to the UE parameter update triggers.

As further shown in FIG. 1B, and by reference number 135, SIM OTA device 120 may create and encrypt a container based on SIM OTA keys. For example, based on the UE parameter update request notification, SIM OTA device 120 may create a container that includes the UE parameter update request, and may encrypt the container to create an encrypted UE parameter update request. As further shown in FIG. 1B, SIM OTA device 120 may cause the encrypted UE parameter update request to be provided to the USIM associated with UE 105 via other components, as described below. For example, SIM OTA device 120 may cause the encrypted UE parameter update request to be provided to the USIM by providing the encrypted UE parameter update request to the UDM.

As shown in FIG. 1C, the UDM may provide a UE parameters update (UPU) protection request to the AUSF, and the AUSF may provide a UPU protection response to the UDM based on the UPU protection request. The UPU protection response may include information that allows the UDM to verify, after UE 105 receives the UE parameter update, that UE 105 correctly received the UE parameter update. Thereafter, the UDM may provide, to the AMF, a subscriber data management (SDM) notification message that includes the encrypted UE parameter update request, and the AMF may provide the encrypted UE parameter update request in a downlink NAS transport message to UE 105. Thereafter, UE 105 may provide the encrypted UE parameter update request to the USIM associated with UE 105.

As further shown in FIG. 1C, and by reference number 140, the USIM associated with UE 105 may verify the authenticity of the content of the encrypted UE parameter update request as being signed by SIM OTA device 120 (e.g., signed with encryption keys associated with SIM OTA device 120). In some implementations, the encrypted UE parameter update request may cause the USIM to determine whether an address associated with the encrypted UE parameter update request matches an address associated with SIM OTA device 120. If the USIM verifies that the address associated with the encrypted UE parameter update request matches the address associated with SIM OTA device 120, the USIM may update the UE parameter and may generate an encrypted UE parameter update response that is signed by the USIM (e.g., signed with encryption keys associated with the USIM). If the USIM fails to verify that the address associated with the encrypted UE parameter update request matches the address associated with SIM OTA device 120, the USIM may not update the UE parameter and may generate an encrypted UE parameter update response indicating that the UE parameter was not updated.

In some implementations, the USIM and UE 105 may utilize a NAS-based channel to respond to the encrypted UE parameter update request with the encrypted UE parameter update response. In some implementations, the USIM associated with UE 105 may utilize a short message service (SMS)-based channel to respond to the encrypted UE parameter update request with the encrypted UE parameter update response. In some implementations, the USIM associated with UE 105 may utilize a direct hypertext transfer protocol (HTTP) interface to respond to the encrypted UE parameter update request with the encrypted UE parameter update response.

As further shown in FIG. 1C, the USIM associated with UE 105 may cause the encrypted UE parameter update response to be provided to SIM OTA device 120. For example, the USIM may cause the encrypted UE parameter update response to be provided to UE 105, and UE 105 may provide the encrypted UE parameter update response in an uplink NAS transport message to the AMF. The AMF may provide, to the UDM, an SDM information request that includes the encrypted UE parameter update response. As further shown in FIG. 1C, and by reference number 145, the UDM may compare a received address associated with the encrypted UE parameter update response with a stored address associated with the USIM.

As shown in FIG. 1D, if the received address associated with the encrypted UE parameter update response matches the stored address associated with the USIM, the UDM may provide the encrypted UE parameter update response to SIM OTA device 120. As further shown in FIG. 1D, and by reference number 150, SIM OTA device 120 may verify the authenticity of the content of the encrypted UE parameter update response as being signed by the USIM associated with UE 105 (e.g., signed with encryption keys associated with the USIM). If SIM OTA device 120 verifies the authenticity of the content of the encrypted UE parameter update response as being signed by the USIM, SIM OTA device 120 may provide a UE parameter update result notification to the UDM. The UE parameter update result notification may indicate that the USIM successfully performed the update of the UE parameter. In this way, SIM OTA device 120, core network 115, and UE 105 may perform a secure UE parameter update that is triggered by the UDM.

Figure 1E:
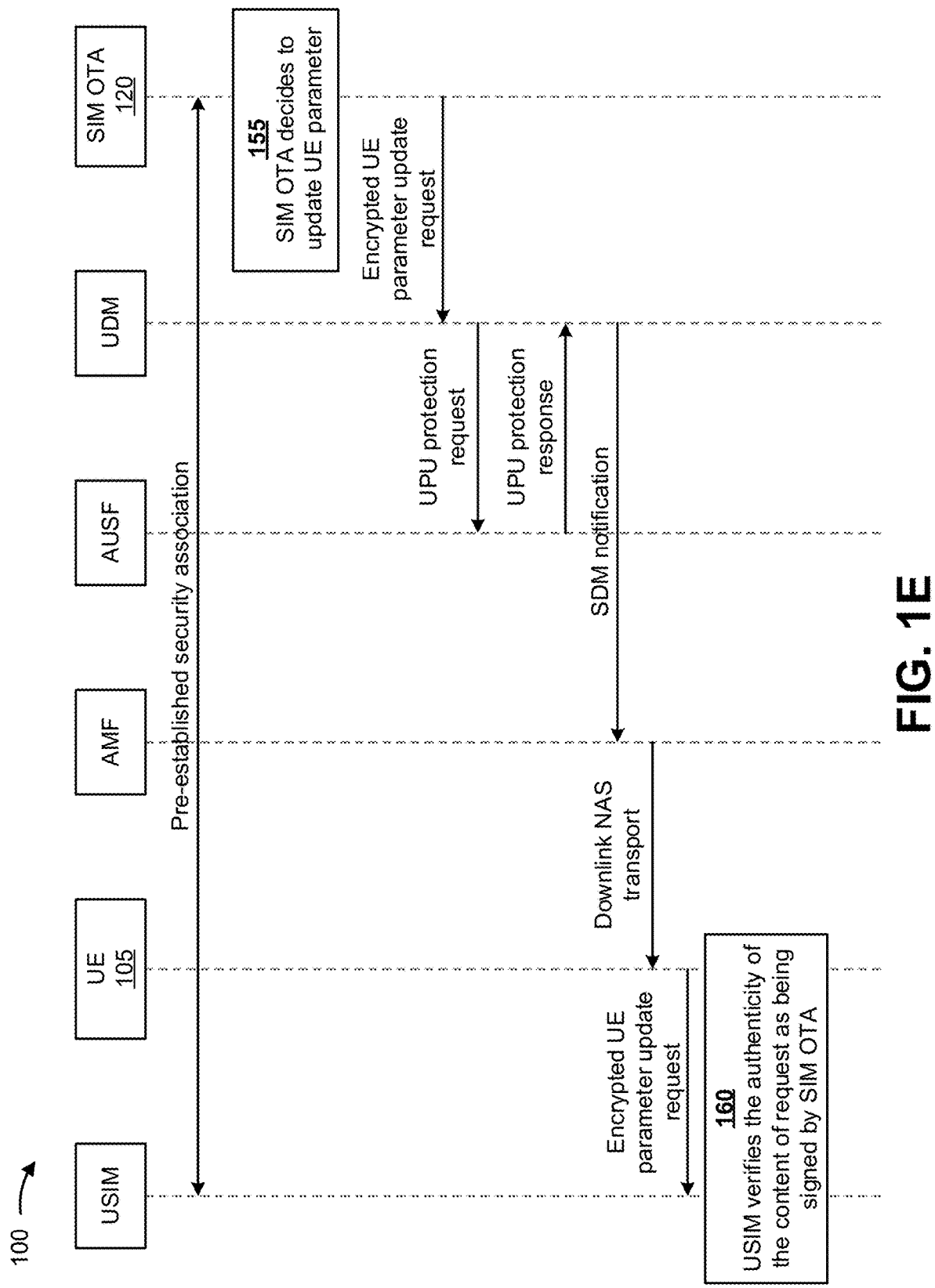
Figure 1F:
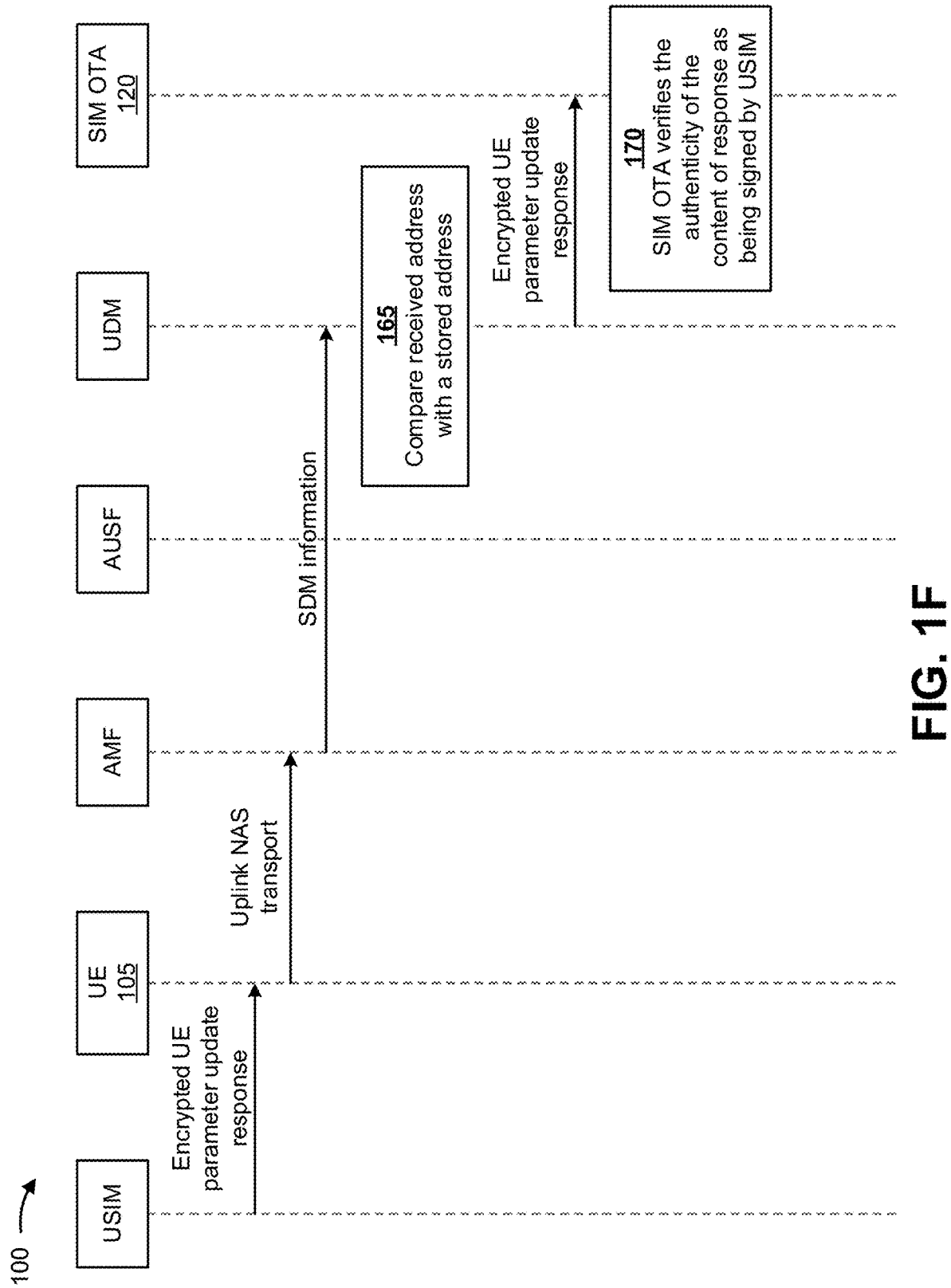

FIGS. 1E and 1F are diagrams of a control flow associated with a secure UE parameter update that is propagated by SIM OTA device 120. In this case, rather than being triggered by the UDM (as described above with respect to FIGS. 1B-1D), the UE parameter update is propagated by SIM OTA device 120 using the UDM and NAS mechanisms. The UE parameter that is updated, as shown in FIGS. 1E and 1F, may include a routing indicator parameter that enables core network 115 to identify a UDM or UDM group, a privacy feature parameter associated with one or more privacy features or attributes, a steering of roaming parameter, an operator value-added service parameter, and/or the like.

As shown in FIG. 1E, SIM OTA device 120 and the USIM associated with UE 105 may have a pre-established security association. The pre-established security association may be established prior to performing the functions described below. As further shown in FIG. 1E, and by reference number 155, SIM OTA device 120 may decide to update the UE parameter based on determining that UE 105 requires a parameter update (e.g., to provide a new service to UE 105), based on UE 105 moving to a different geographical area, based on UE 105 requiring a new service, based on UE 105 terminating a service, and/or the like. Based on deciding to update the UE parameter, SIM OTA device 120 may generate an encrypted UE parameter update request indicating an update. The encrypted UE parameter update request may include information identifying the UE parameter to be updated, one or more current values for the UE parameter, one or more recommended new values for the UE parameter, and/or the like. In some implementations, SIM OTA device 120 may create and encrypt a container based on SIM OTA keys. For example, SIM OTA device 120 may create a container that includes the UE parameter update request, and may encrypt the container to create the encrypted UE parameter update request.

As further shown in FIG. 1E, SIM OTA device 120 may cause the encrypted UE parameter update request to be provided to the USIM associated with UE 105. For example, SIM OTA device 120 may cause the encrypted UE parameter update request to be provided to the USIM by providing the encrypted UE parameter update request to the UDM. As further shown in FIG. 1E, the UDM may provide a UPU protection request to the AUSF, and the AUSF may provide a UPU protection response to the UDM based on the UPU protection request. The UPU protection response may include information that allows the UDM to verify, after UE 105 receives the UE parameter update, that UE 105 correctly received the UE parameter update. Thereafter, the UDM may provide, to the AMF, a SDM notification message that includes the encrypted UE parameter update request, and the AMF may provide the encrypted UE parameter update request in a downlink NAS transport message to UE 105. Thereafter, UE 105 may provide the encrypted UE parameter update request to the USIM associated with UE 105.

As further shown in FIG. 1E, and by reference number 160, the USIM associated with UE 105 may verify the authenticity of the content of the encrypted UE parameter update request as being signed by SIM OTA device 120 (e.g., signed with encryption keys associated with SIM OTA device 120). In some implementations, the encrypted UE parameter update request may cause the USIM to determine whether an address associated with the encrypted UE parameter update request matches an address associated with SIM OTA device 120. If the USIM verifies that the address associated with the encrypted UE parameter update request matches the address associated with SIM OTA device 120, the USIM may update the UE parameter and may generate an encrypted UE parameter update response that is signed by the USIM (e.g., signed with encryption keys associated with the USIM). If the USIM fails to verify that the address associated with the encrypted UE parameter update request matches the address associated with SIM OTA device 120, the USIM may not update the UE parameter and may generate an encrypted UE parameter update response indicating that the UE parameter was not updated. In some implementations, the USIM associated with UE 105 may utilize a NAS-based channel, an SMS-based channel, an HTTP interface, and/or the like to respond to the encrypted UE parameter update request with the encrypted UE parameter update response.

As shown in FIG. 1F, the USIM may provide the encrypted UE parameter update response to UE 105, and UE 105 may provide the encrypted UE parameter update response in an uplink NAS transport message to the AMF. The AMF may provide, to the UDM, an SDM information request that includes the encrypted UE parameter update response. As further shown in FIG. 1F, and by reference number 165, the UDM may compare a received address associated with the encrypted UE parameter update response with a stored address associated with the USIM.

As shown in FIG. 1F, if the received address associated with the encrypted UE parameter update response matches the stored address associated with the USIM, the UDM may provide the encrypted UE parameter update response to SIM OTA device 120. As further shown in FIG. 1F, and by reference number 170, SIM OTA device 120 may verify the authenticity of the content of the encrypted UE parameter update response as being signed by the USIM associated with UE 105 (e.g., signed by encryption keys associated with the USIM). If SIM OTA device 120 verifies the authenticity of the content of the encrypted UE parameter update response as being signed by the USIM, SIM OTA device 120 may determine the UE parameter update has been successfully performed the USIM. In this way, SIM OTA device 120, core network 115, and UE 105 may perform a secure UE parameter update that is propagated by SIM OTA device 120.

In this way, UDM 220 may utilize security features of SIM OTA device 120, and SIM OTA device 120 may securely update and manage USIM information (e.g., UE parameters to be updated) via core network 115. An update of UE parameters may be identified and triggered in UDM 220 and/or SIM OTA device 120 may propagate the updated UE parameters using UDM 220. Thus, SIM OTA device 120 conserves computing resources, networking resources, and/or the like that would otherwise be wasted detecting malicious activity associated with the UE parameters, correcting malicious acts caused with the UE parameters, and/or the like.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
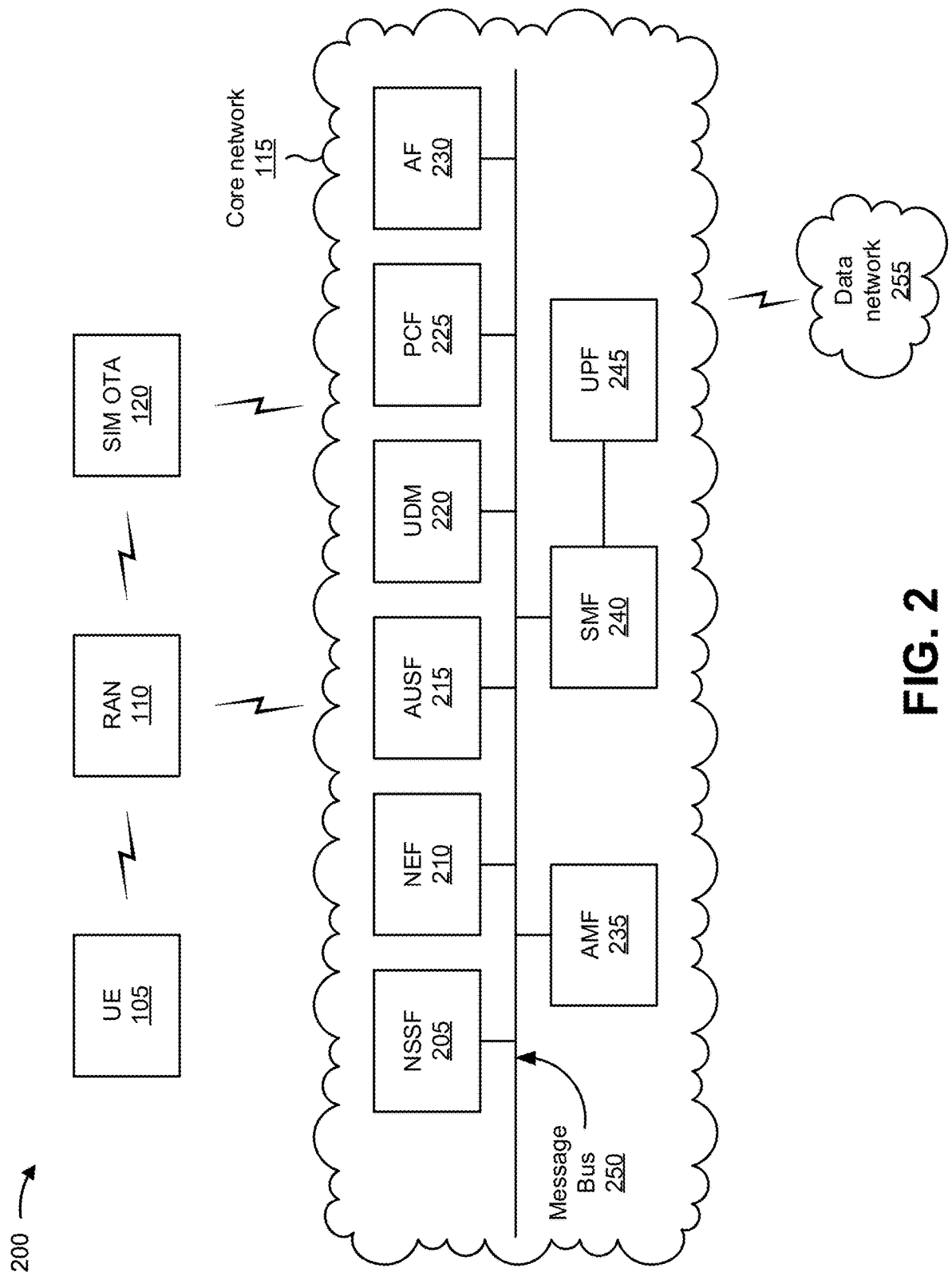
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user equipment 105, RAN 110, core network 115, SIM OTA device 120, and a data network 255. Devices and/or networks of example environment 200 may interconnect via wired connections, wireless connections, or a combination of wired and wireless connections.

User equipment 105 includes one or more devices capable of receiving, generating, storing, processing, and/or providing information, such as information described herein. For example, user equipment 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user equipment 105. RAN 110 may transfer traffic between user equipment 105 (e.g., using a cellular RAT), base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for user equipment 105 covered by RAN 110 (e.g., user equipment 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of user equipment 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user equipment 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user equipment 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communications sessions in the wireless telecommunications system. For example, SMF 240 may configure traffic steering policies at UPF 245, enforce user equipment IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

SIM OTA device 120 includes one or more devices capable of receiving, generating, storing, processing, and/or providing information, such as information described herein. For example, SIM OTA device 120 may include a server device, a group of server devices, or a similar type of device. In some implementations, SIM OTA device 120 may receive information from and/or transmit information to user equipment 105, RAN 110, and/or core network 115.

SIM OTA device 120 may communicate with the USIM of user equipment 105, may download applications to the USIM, may manage the USIM, may update and change data in the USIM, and/or the like, without being connected physically to the USIM. SIM OTA device 120 may enable a network operator to introduce new SIM services and/or to remotely modify the contents of the USIM in a rapid and cost-effective manner. In some implementations, SIM OTA device 120 may perform the functions described above in connection with FIGS. 1A-1F.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
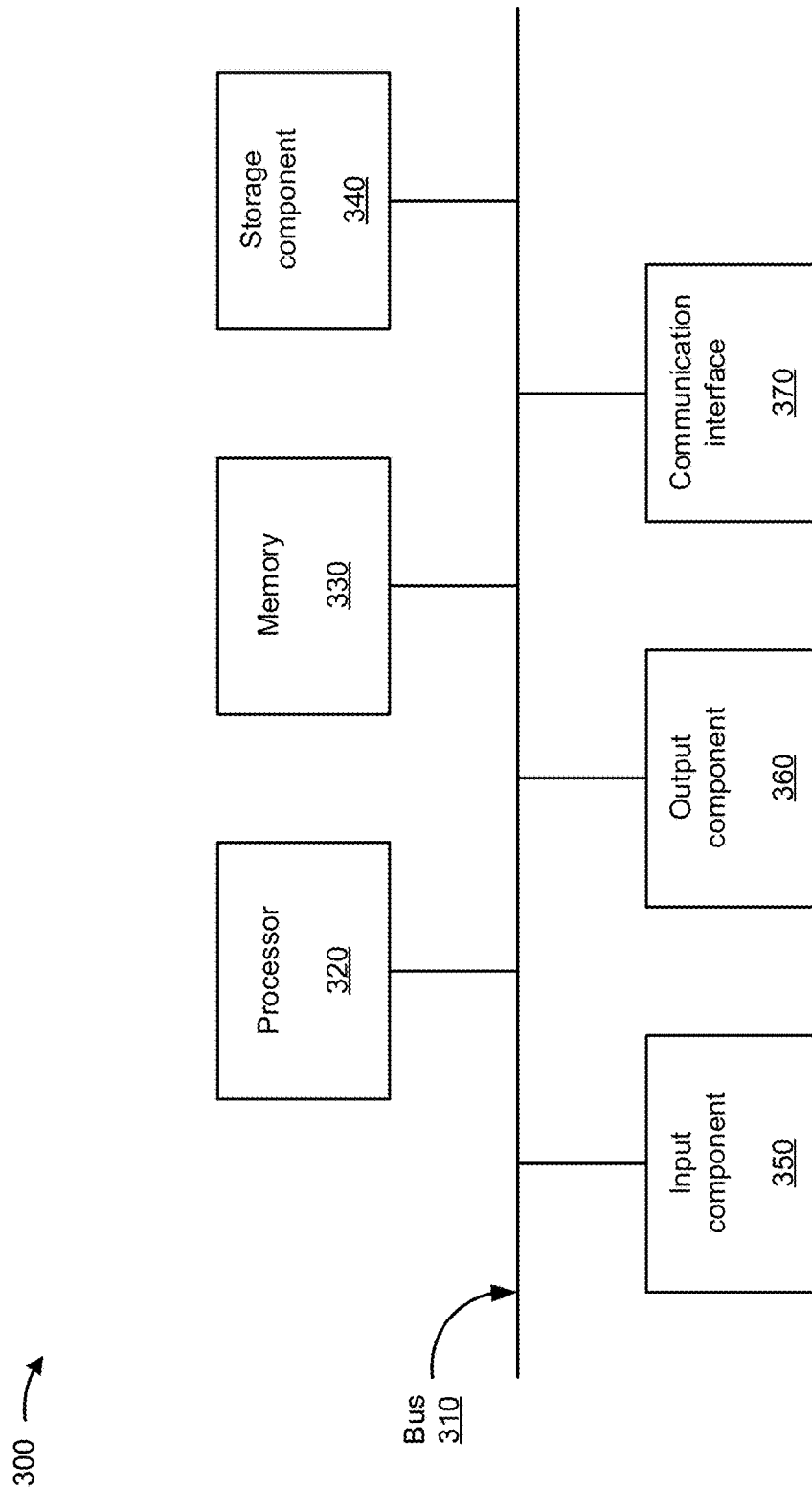
FIG. 3 is a diagram of example components of one or more devices of FIG. 2.

FIG. 3 is a diagram of example components of a device 300. Device 300 may correspond to user equipment 105, SIM OTA device 120, NSSF 205, NEF 210, AUSF 215, UDM 220, PCF 225, AF 230, AMF 235, SMF 240, and/or UPF 245. In some implementations, user equipment 105, SIM OTA device 120, NSSF 205, NEF 210, AUSF 215, UDM 220, PCF 225, AF 230, AMF 235, SMF 240, and/or UPF 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for securely updating and managing universal subscriber identity module information via networks. In some implementations, one or more process blocks of FIG. 4 may be performed by a device (e.g., SIM OTA device 120). In some implementations, one or more process blocks of FIG. 4 may be performed by another device or a group of devices separate from or including the device, such as a UDM (e.g., UDM 220).

As shown in FIG. 4, process 400 may include receiving, from a network device of a core network, a user equipment parameter update request notification indicating an update to a user equipment parameter of a universal subscriber identity module of a user equipment (block 410). For example, the device (e.g., using processor 320, communication interface 370, and/or the like) may receive, from a network device of a core network, a user equipment parameter update request notification indicating an update to a user equipment parameter of a universal subscriber identity module of a user equipment, as described above. The device may include a subscriber identity module over-the-air device, and the network device may include a unified data management device. In some implementations, process 400 may include establishing an interface between the device and the network device prior to providing, to the network device, the request to subscribe to the user equipment parameter update triggers. The user equipment parameter may include a routing indicator parameter, a privacy feature parameter, a steering of roaming parameter, or an operator valued-added service parameter. The user equipment parameter update request notification may include information indicating one or more recommended values for the user equipment parameter of the universal subscriber identity module.

As further shown in FIG. 4, process 400 may include generating an encrypted user equipment parameter update request based on the user equipment parameter update request notification (block 420). For example, the device (e.g., using processor 320, memory 330, and/or the like) may generate an encrypted user equipment parameter update request based on the user equipment parameter update request notification, as described above.

As further shown in FIG. 4, process 400 may include causing the encrypted user equipment parameter update request to be provided to the universal subscriber identity module of the user equipment, to cause the universal subscriber identity module to update the user equipment parameter and to generate an encrypted user equipment parameter update response (block 430). For example, the device (e.g., using processor 320, communication interface 370, and/or the like) may cause the encrypted user equipment parameter update request to be provided to the universal subscriber identity module of the user equipment, as described above. In some implementations, the encrypted user equipment parameter update request may cause the universal subscriber identity module to update the user equipment parameter and to generate an encrypted user equipment parameter update response. The universal subscriber identity module may utilize a non-access stratum-based channel, a short message service-based channel, and/or a direct hypertext transfer protocol interface to process and respond to the encrypted user equipment parameter update request.

As further shown in FIG. 4, process 400 may include receiving, from the network device, the encrypted user equipment parameter update response (block 440). For example, the device (e.g., using processor 320, storage component 340, communication interface 370, and/or the like) may receive, from the network device, the encrypted user equipment parameter update response, as described above. The encrypted user equipment parameter update request may cause the universal subscriber identity module to determine whether an address associated with the encrypted user equipment parameter update response matches an address associated with the universal subscriber identity module before providing the encrypted user equipment parameter update response to the device.

As further shown in FIG. 4, process 400 may include verifying an authenticity of content of the encrypted user equipment parameter update response based on whether the encrypted user equipment parameter update response is signed by the universal subscriber identity module (block 450). For example, the device (e.g., using processor 320, memory 330, and/or the like) may verify an authenticity of content of the encrypted user equipment parameter update response based on whether the encrypted user equipment parameter update response is signed by the universal subscriber identity module, as described above.

As further shown in FIG. 4, process 400 may include providing, to the network device, a result notification indicating whether the user equipment parameter is updated and whether the authenticity of the content of the encrypted user equipment parameter update response is verified (block 460). For example, the device (e.g., using processor 320, memory 330, communication interface 370, and/or the like) may provide, to the network device, a result notification indicating whether the user equipment parameter is updated and whether the authenticity of the content of the encrypted user equipment parameter update response is verified, as described above.

Process 400 may include additional implementations, such as any single implementation or any combination of implementations described below and/or in connection with one or more other processes described elsewhere herein.

In some implementations, process 400 may include establishing a security association with the universal subscriber identity module of the user equipment prior to receiving the user equipment parameter update request notification; providing, to the network device, a request to subscribe to user equipment parameter update triggers prior to receiving the user equipment parameter update request notification; and receiving the user equipment parameter update request notification based on subscribing to the user equipment parameter update triggers.

In some implementations, process 400 may include generating another encrypted user equipment parameter update request indicating another update to another user equipment parameter of the universal subscriber identity module; and causing the other encrypted user equipment parameter update request to be provided to the universal subscriber identity module of the user equipment, where the other encrypted user equipment parameter update request may cause the universal subscriber identity module to update the other user equipment parameter and to generate another encrypted user equipment parameter update response indicating that the other user equipment parameter is updated.

In some implementations, process 400 may include receiving, from the network device, the other encrypted user equipment parameter update response; verifying an authenticity of content of the other encrypted user equipment parameter update response based on whether the other encrypted user equipment parameter update response is signed by the universal subscriber identity module; and providing, to the network device, another result notification indicating whether the other user equipment parameter is updated and whether the authenticity of the content of the other encrypted user equipment parameter update response is verified.

In some implementations, process 400 may include establishing a security association with the universal subscriber identity module of the user equipment prior to generating the other encrypted user equipment parameter update request.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device and from a network device of a core network, a user equipment parameter update request notification indicating an update to a user equipment parameter of a universal subscriber identity module of a user equipment;
generating, by the device, an encrypted user equipment parameter update request based on the user equipment parameter update request notification;
causing, by the device, the encrypted user equipment parameter update request to be provided to the universal subscriber identity module of the user equipment, to cause an update of the user equipment parameter by the universal subscriber identity module and to generate an encrypted user equipment parameter update response;
receiving, by the device and from the network device, the encrypted user equipment parameter update response;
verifying, by the device, an authenticity of content of the encrypted user equipment parameter update response based on whether the encrypted user equipment parameter update response is signed by the universal subscriber identity module; and
providing, by the device and to the network device, a result notification indicating whether the user equipment parameter is updated and whether the authenticity of the content of the encrypted user equipment parameter update response is verified.

2. The method of claim 1, further comprising:
establishing a security association with the universal subscriber identity module of the user equipment prior to receiving the user equipment parameter update request notification; and
providing, to the network device, a request to subscribe to user equipment parameter update triggers prior to receiving the user equipment parameter update request notification, wherein receiving the user equipment parameter update request notification includes:
receiving the user equipment parameter update request notification based on subscribing to the user equipment parameter update triggers.

3. The method of claim 1, further comprising:
generating another encrypted user equipment parameter update request indicating another update to another user equipment parameter of the universal subscriber identity module; and
causing the other encrypted user equipment parameter update request to be provided to the universal subscriber identity module of the user equipment,
wherein the other encrypted user equipment parameter update request causes an update of the other user equipment parameter by the universal subscriber identity module and to generate another encrypted user equipment parameter update response indicating that the other user equipment parameter is updated.

4. The method of claim 3, further comprising:
receiving, from the network device, the other encrypted user equipment parameter update response;
verifying an authenticity of content of the other encrypted user equipment parameter update response based on whether the other encrypted user equipment parameter update response is signed by the universal subscriber identity module; and
providing, to the network device, another result notification indicating whether the other user equipment parameter is updated and whether the authenticity of the content of the other encrypted user equipment parameter update response is verified.

5. The method of claim 3, further comprising:
establishing a security association with the universal subscriber identity module of the user equipment prior to generating the other encrypted user equipment parameter update request.

6. The method of claim 1, wherein the encrypted user equipment parameter update request causes a determination of whether an address associated with the encrypted user equipment parameter update response matches an address associated with the universal subscriber identity module before providing the encrypted user equipment parameter update response to the device, wherein the determination is performed by the universal subscriber identity module.

7. The method of claim 1, wherein:
the device includes a subscriber identity module over-the-air device, and
the network device includes a unified data management device.

8. A device, comprising:
one or more memories;
one or more processors, coupled to the one or more memories, configured to:
establish a security association with a universal subscriber identity module of a user equipment;
provide, to a network device of a core network, a request to subscribe to user equipment parameter update triggers;
receive, from the network device and based on subscribing to the user equipment parameter update triggers, a user equipment parameter update request notification indicating an update to a user equipment parameter of the universal subscriber identity module;
generate an encrypted user equipment parameter update request based on the user equipment parameter update request notification;
cause the encrypted user equipment parameter update request to be provided to the universal subscriber identity module of the user equipment,
wherein the encrypted user equipment parameter update request causes an update of the user equipment parameter by the universal subscriber identity module and generates an encrypted user equipment parameter update response indicating that the user equipment parameter is updated;
receive, from the network device, the encrypted user equipment parameter update response;
verify an authenticity of content of the encrypted user equipment parameter update response based on whether the encrypted user equipment parameter update response is signed by the universal subscriber identity module; and
provide, to the network device, a result notification indicating whether the user equipment parameter is updated and whether the authenticity of the content of the encrypted user equipment parameter update response is verified.

9. The device of claim 8, wherein the one or more processors are further configured to:
establish an interface between the device and the network device prior to providing, to the network device, the request to subscribe to the user equipment parameter update triggers.

10. The device of claim 8, wherein the user equipment parameter includes one or more of:
a routing indicator parameter,
a privacy feature parameter,
a steering of roaming parameter, or
an operator value-added service parameter.

11. The device of claim 8, wherein the user equipment parameter update request notification includes information indicating one or more recommended values for the user equipment parameter of the universal subscriber identity module.

12. The device of claim 8, wherein the universal subscriber identity module utilizes a non-access stratum-based channel to process and respond to the encrypted user equipment parameter update request.

13. The device of claim 8, wherein the universal subscriber identity module utilizes a short message service-based channel to process and respond to the encrypted user equipment parameter update request.

14. The device of claim 8, wherein the universal subscriber identity module utilizes a direct hypertext transfer protocol interface to process and respond to the encrypted user equipment parameter update request.

15. A non-transitory computer-readable medium storing instructions, the instructions comprising:
one or more instructions that, when executed by one or more processors of a device, cause the one or more processors to:
establish an interface between the device and a network device of a core network;
receive, from the network device and via the interface, a user equipment parameter update request notification indicating an update to a user equipment parameter of a universal subscriber identity module of a user equipment;
generate an encrypted user equipment parameter update request based on the user equipment parameter update request notification;
cause the encrypted user equipment parameter update request to be provided to the universal subscriber identity module of the user equipment,
wherein the encrypted user equipment parameter update request causes an update of the user equipment parameter by the universal subscriber identity module and generates an encrypted user equipment parameter update response indicating that the user equipment parameter is updated;
receive, from the network device and via the interface, the encrypted user equipment parameter update response;
verify an authenticity of content of the encrypted user equipment parameter update response based on whether the encrypted user equipment parameter update response is signed by the universal subscriber identity module; and
provide, to the network device and via the interface, a result notification indicating whether the user equipment parameter is updated and whether the authenticity of the content of the encrypted user equipment parameter update response is verified.

16. The non-transitory computer-readable medium of claim 15, wherein the instructions further comprise:
one or more instructions that, when executed by the one or more processors, cause the one or more processors to:
establish a security association with the universal subscriber identity module of the user equipment prior to receiving the user equipment parameter update request notification; and provide, to the network device, a request to subscribe to user equipment parameter update triggers prior to receiving the user equipment parameter update request notification,
    wherein the one or more instructions, that cause the one or more processors to receive the user equipment parameter update request notification, further cause the one or more processors to:
        receive the user equipment parameter update request notification based on subscribing to the user equipment parameter update triggers.

17. The non-transitory computer-readable medium of claim 15, wherein the instructions further comprise:
    one or more instructions that, when executed by the one or more processors, cause the one or more processors to:
        generate another encrypted user equipment parameter update request indicating another update to another user equipment parameter of the universal subscriber identity module;
        cause the other encrypted user equipment parameter update request to be provided to the universal subscriber identity module of the user equipment,
            wherein the other encrypted user equipment parameter update request causes an update of the other user equipment parameter by the universal subscriber identity module and generates another encrypted user equipment parameter update response indicating that the other user equipment parameter is updated;
        receive, from the network device, the other encrypted user equipment parameter update response;
        verify an authenticity of content of the other encrypted user equipment parameter update response based on whether the other encrypted user equipment parameter update response is signed by the universal subscriber identity module; and
        provide, to the network device, another result notification indicating whether the other user equipment parameter is updated and whether the authenticity of the content of the other encrypted user equipment parameter update response is verified.

18. The non-transitory computer-readable medium of claim 15, wherein the instructions further comprise:
    one or more instructions that, when executed by the one or more processors, cause the one or more processors to:
        establish a security association with the universal subscriber identity module of the user equipment prior to generating the other encrypted user equipment parameter update request.

19. The non-transitory computer-readable medium of claim 15, wherein the user equipment parameter update request notification includes information indicating one or more recommended values for the user equipment parameter of the universal subscriber identity module.

20. The non-transitory computer-readable medium of claim 15, wherein the universal subscriber identity module utilizes one or more of:
    a non-access stratum-based channel to process and respond to the encrypted user equipment parameter update request,
    a short message service-based channel to process and respond to the encrypted user equipment parameter update request, or
    a direct hypertext transfer protocol interface to process and respond to the encrypted user equipment parameter update request.

* * * * *